United States Patent
Barker

(10) Patent No.: US 10,218,298 B2
(45) Date of Patent: Feb. 26, 2019

(54) SPILLOVER OF REACTIVE CURRENT TO LINE SIDE CONVERTER

(71) Applicant: General Electric Company, Schenectady, NY (US)

(72) Inventor: Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 15/290,162

(22) Filed: Oct. 11, 2016

(65) Prior Publication Data
US 2018/0102720 A1    Apr. 12, 2018

(51) Int. Cl.
| | |
|---|---|
| *F03D 9/00* | (2016.01) |
| *H02P 9/04* | (2006.01) |
| *H02P 9/00* | (2006.01) |
| *G05F 1/70* | (2006.01) |
| *H02J 3/38* | (2006.01) |
| *F03D 9/25* | (2016.01) |
| *H02P 101/15* | (2016.01) |
| *F03D 7/02* | (2006.01) |

(52) U.S. Cl.
CPC .............. *H02P 9/007* (2013.01); *F03D 9/255* (2017.02); *G05F 1/70* (2013.01); *H02J 3/386* (2013.01); *F03D 7/028* (2013.01); *H02P 2101/15* (2015.01)

(58) Field of Classification Search
CPC . H02P 9/007; F03D 9/003; F03D 9/25; H02K 7/183
See application file for complete search history.

(56) References Cited

U.S. PATENT DOCUMENTS

| | | | | |
|---|---|---|---|---|
| 5,798,631 | A * | 8/1998 | Spee ................ | F03D 7/0272 290/31 |
| 5,808,880 | A * | 9/1998 | Marvin .............. | H02M 1/4233 318/803 |
| 8,198,742 | B2 * | 6/2012 | Jorgensen ............ | F03D 7/0224 290/44 |
| 9,680,306 | B2 * | 6/2017 | Xue ..................... | H02J 3/386 |
| 2010/0327584 | A1 * | 12/2010 | Fortmann ............ | H02J 3/18 290/44 |
| 2015/0311696 | A1 * | 10/2015 | Zhu ..................... | H02H 7/06 361/21 |
| 2017/0074247 | A1 | 3/2017 | Smith | |

* cited by examiner

*Primary Examiner* — Tulsidas C Patel
*Assistant Examiner* — Thomas K Quigley
(74) *Attorney, Agent, or Firm* — Dority & Manning, P.A.

(57) ABSTRACT

Systems and methods for controlling reactive current output of a line converter in a power system are provided. In one example embodiment, a method includes receiving a margin signal determined based at least in part on a stator current margin or a rotor current margin. The method includes determining a spillover margin based at least in part on the margin signal. The method includes determining an adjusted spillover margin using a spillover gain. The method includes determining a reactive current command for a line converter based at least in part on the adjusted spillover margin. The method includes controlling the output of the reactive current by the line converter based at least in part on the reactive current command. The spillover gain is variable based at least in part on a maximum line converter current.

17 Claims, 4 Drawing Sheets

300

SPILLOVER OF REACTIVE CURRENT TO LINE SIDE CONVERTER

FIELD OF THE INVENTION

The present subject matter relates generally to power systems, and more particularly to systems and methods for controlling reactive current in two-stage power converters used in, for instance, wind turbine power systems.

BACKGROUND OF THE INVENTION

A wind turbine can include a turbine that has a rotor that includes a rotatable hub assembly having one or more blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency (e.g., 50 Hz, 60 Hz, etc.). Moreover, such converters, in conjunction with the DFIG, also transmit electric power between the utility grid and the generator as well as transmit generator excitation power to a wound generator rotor from one of the connections to the electric utility grid connection.

In some implementations, the power converter can be a two-stage power converter that includes a rotor side converter coupled to the rotor of the DFIG and a line side converter coupled to the rotor side converter via a DC bus. The rotor side converter can convert AC power generated at the DFIG to DC power for the DC bus. The line side converter can convert DC power from the DC bus to AC power for application to, for instance, an electrical grid.

In some cases, a wind turbine may be controlled to provide output reactive power (e.g., VARS) to meet certain power demands or other functionality. To achieve the desired output reactive power, reactive current can be shifted from the stator of the DFIG to the line side converter. For instance, the reactive current can go to the rotor side converter which then spills over to the line side converter or between other components of a power system. Various gains can be used in the control logic for determining control commands for the output reactive current of the line side converter. In previous implementations, certain gains were static values. These static values may not allow for full spillover or shifting of the reactive current to the line converter.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method of controlling a reactive current output of a line side converter used in a power system. The method includes receiving, by one or more control devices, a margin signal determined based at least in part on a stator current margin or a rotor current margin. The method includes determining, by the one or more control devices, a spillover margin based at least in part on the margin signal. The method includes determining, by the one or more control devices, an adjusted spillover margin using a spillover gain. The method includes determining, by the one or more control devices, a reactive current command for a line side converter based at least in part on the reactive current command. The method includes controlling, by the one or more control devices, the output of reactive current by the line converter based at least in part on the reactive current command. The spillover gain is variable based at least in part on a maximum line converter current.

Another example aspect of the present disclosure is directed to a control system configured to control reactive current output of a power converter of a doubly fed induction generator wind power system. The power converter includes a rotor side converter and a line side converter coupled to together by a DC bus. The control system includes a memory to store instructions and a processor to execute the stored instructions. The instructions when executed by the processor cause the control system to: receive a margin signal determined based at least in part on a stator current margin or a rotor current margin; determine a spillover margin based on the margin signal; determine an adjusted spillover margin using a spillover gain; and determine a reactive current command for a line converter based on the adjusted spillover margin. The spillover gain is configured to allow full spillover of reactive current from a rotor side converter to the line side converter.

Another example aspect of the present disclosure is directed to a wind turbine system. The system includes a wind driven generator. The system includes a power converter having a rotor side converter and a line side converter. The system includes a controller configured to execute computer-readable instructions that cause the controller to perform operations. The operations include receiving a margin signal determined based at least in part on a stator current margin or a rotor current margin; determining a spillover margin based on the margin signal; determining an adjusted spillover margin using a spillover gain; and determining a reactive current command for a line converter based on the adjusted spillover margin. The spillover gain is configured to allow full spillover of reactive current from a rotor side converter to the line side converter.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
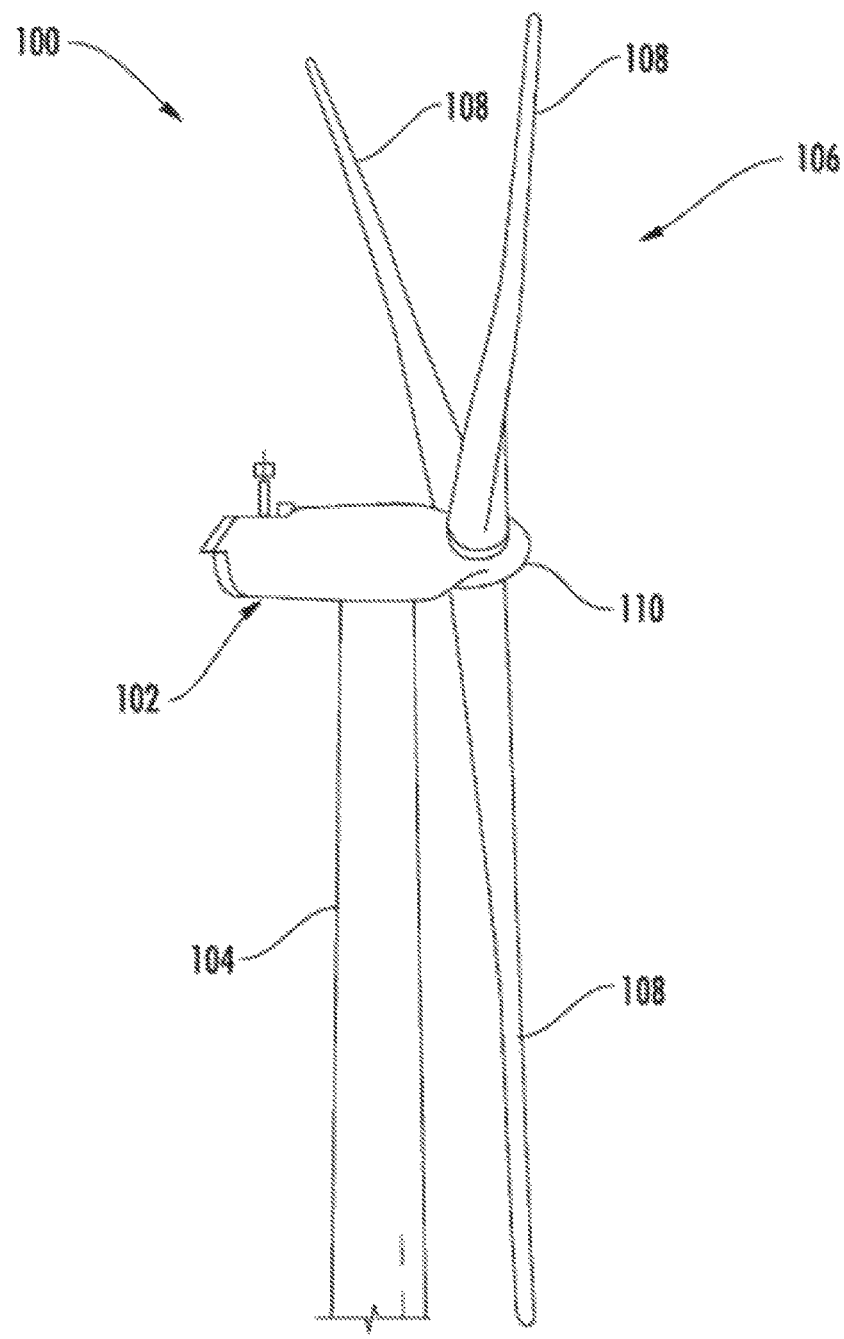
FIG. 1 depicts a portion of an example wind turbine according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for controlling reactive current output of a line converter in a power system, such as a DFIG wind power system having a line side converter and a rotor side converter. To achieve a desired output reactive power of a power system, reactive current can be shifted from the stator of the DFIG to the line side converter or between other components of a power system. For instance, the reactive current can go to the rotor side converter which then spills over to the line side converter. Various gains can be used in the control logic for determining control commands for the output reactive current of the line side converter. Example aspects of the present disclosure are discussed with reference to reactive current spilling over from the rotor side converter to the line side converter. Those of ordinary skill in the art, using the disclosures provided herein, will understand that reactive power can spillover or shift between other components of a power system without deviating from the scope of the present disclosure.

According to example aspects of the present disclosure, a variable gain can be used in determining a reactive power command for a line current that allows for full spillover or shifting of reactive current from the rotor side converter to the line side converter. For instance, the variable gain can be determined based at least in part on a line converter setpoint (e.g., determined based on a maximum line converter current). A variable gain can be any gain that is adjusted from time to time, for instance, dynamically during operation or during configuration.

In this way, a technical effect of example embodiments of the present disclosure can include providing for full spillover or shifting of reactive power current to a line side converter in a power system. Example schemes, systems, methods, and circuitry to accomplish this technical effect will be discussed further below with reference to the Figures. Further, although example aspects of the present disclosure are discussed with reference to a wind turbine system for purposes of illustration and discussion, those of ordinary skill in the art, using the disclosures provided herein, will understand that various aspects of any of the embodiments disclosed herein can be used with other power systems, such as solar power systems, gas turbine systems, energy storage systems, and other power systems.

FIG. 1 is a perspective view of a portion of an example wind turbine 100. Wind turbine 100 can include a nacelle 102 housing a generator (not shown in FIG. 1). Nacelle 102 can be mounted on a tower 104 (a portion of tower 104 being shown in FIG. 1). Tower 104 may have any suitable height/altitude (e.g., 75 m, 120 m, etc.) that facilitates operation of wind turbine 100 as described herein. Wind turbine 100 can also include a rotor 106 that includes three blades 108 attached to a rotating hub 110. Wind turbine 100 can include any number of blades 108 that facilitates operation of wind turbine 100 as described herein. In example embodiments, wind turbine 100 can include a gearbox operatively coupled to rotor 106 and a generator.

Figure 2:
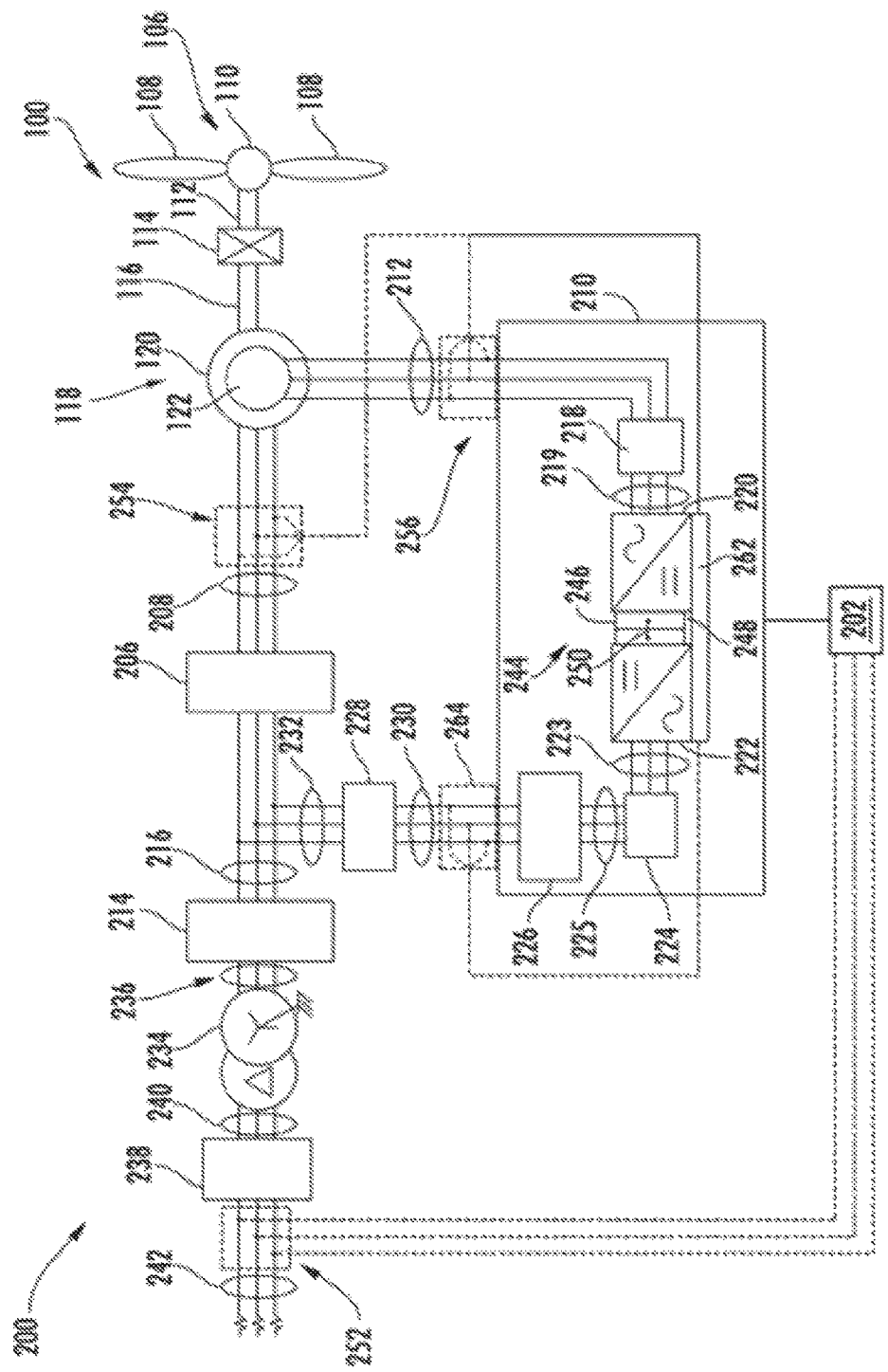
FIG. 2 depicts an example electrical and control system of an example wind turbine according to example embodiments of the present disclosure.

FIG. 2 is a schematic view of an example electrical and control system 200 that may be used with wind turbine 100. Rotor 106 can include blades 108 coupled to hub 110. Rotor 106 can also include a low-speed shaft 112 rotatably coupled to hub 110. Low-speed shaft 112 can be coupled to a step-up gearbox 114 that can be configured to step up the rotational speed of low-speed shaft 112 and transfer that speed to a high-speed shaft 116. In one example embodiment, gearbox 114 can have a step-up ratio of approximately 70:1. For example, low-speed shaft 112 rotating at approximately 20 revolutions per minute (rpm) coupled to gearbox 114 with an approximately 70:1 step-up ratio can generate a speed for high-speed shaft 116 of approximately 1400 rpm. As used herein, the use of the term "about" or "approximately" in conjunction with a stated numerical value refers to within 25% of the stated numerical value. Gearbox 114 can have any suitable step-up ratio that facilitates operation of wind turbine 100 as described herein. In one embodiment, wind turbine 100 can include a direct-drive generator that is rotatably coupled to rotor 106 without any intervening gearbox.

High-speed shaft 116 can be rotatably coupled to generator 118. In one example embodiment, generator 118 can be a wound rotor, three-phase, double-fed induction (asynchronous) generator (DFIG) that includes a generator stator 120 magnetically coupled to a generator rotor 122. In one embodiment, generator rotor 122 can include a plurality of permanent magnets.

Electrical and control system 200 can include one or more control devices, such as a turbine controller 202. Turbine controller 202 can include one or more processors and one or more memory devices. The turbine controller 202 can further include, at least one processor input channel and at least one processor output channel. In example embodiments, the turbine controller 202 can include one or more computing devices.

As used herein, the term computing device is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein. In one example embodiment, a memory device can include, but is not limited to, a computer-readable medium, such as a random access memory (RAM). In one embodiment, one or more storage devices, such as a floppy disk, a compact disc read only memory (CD-ROM), a magneto-optical disk (MOD), and/or a digital versatile disc (DVD) can be used. Also, in one example embodiment, additional input channels can be, but are not limited to, computer peripherals associated with an operator interface such as a mouse and a keyboard. Further, in one embodiment, additional output channels may include, but are not limited to, an operator interface monitor.

One or more processors for turbine controller 202 can process information transmitted from a plurality of electrical and electronic devices that may include, but are not limited to, voltage and current transducers. RAM, ROM, and/or storage devices can store and transfer information and instructions to be executed by the one or more processors. RAM, ROM and/or storage devices can also be used to store and provide temporary variables, static (i.e., non-changing) information and instructions, or other intermediate information to the one or more processors during execution of instructions by the one or more processors. Instructions that are executed include, but are not limited to, resident conversion and/or algorithms. The execution of sequences of instructions is not limited to any specific combination of hardware circuitry and software instructions.

Referring still to FIG. 2, generator stator 120 can be electrically coupled to a stator synchronizing switch 206 via a stator bus 208. In an example embodiment, to facilitate the DFIG configuration, generator rotor 122 can be electrically coupled to a bi-directional power conversion assembly 210 via a rotor bus 212. In one embodiment, generator rotor 122 can be electrically coupled to rotor bus 212 via any other device that facilitates operation of electrical and control system 200 as described herein. In one embodiment, electrical and control system 200 can be configured as a full power conversion system that includes a full power conversion assembly similar in design and operation to power conversion assembly 210 and electrically coupled to generator stator 120. The full power conversion assembly can facilitate channeling electric power between generator stator 120 and an electric power transmission and distribution grid. In one example embodiment, stator bus 208 can transmit three-phase power from generator stator 120 to stator synchronizing switch 206. Rotor bus 212 can transmit three-phase power from generator rotor 122 to power conversion assembly 210. In one embodiment, stator synchronizing switch 206 can be electrically coupled to a main transformer circuit breaker 214 via a system bus 216. In one embodiment, one or more fuses (not shown) are used instead of main transformer circuit breaker 214. In another embodiment, neither fuses nor main transformer circuit breaker 214 is used.

Power conversion assembly 210 can include a rotor filter 218 that is electrically coupled to generator rotor 122 via rotor bus 212. A rotor filter bus 219 can electrically couple rotor filter 218 to a rotor-side power converter 220, and rotor-side power converter 220 can be electrically coupled to a line-side power converter 222. Rotor-side power converter 220 and line-side power converter 222 can be power converter bridges including power semiconductors. In one embodiment, rotor-side power converter 220 and line-side power converter 222 can be configured in a three-phase, pulse width modulation (PWM) configuration including insulated gate bipolar transistor (IGBT) switching devices. In one embodiment, rotor-side power converter 220 and line-side power converter 222 can have any configuration using any switching devices that facilitate operation of electrical and control system 200 as described herein. Power conversion assembly 210 can be coupled in electronic data communication with turbine controller 202 to control the operation of rotor-side power converter 220 and line-side power converter 222.

In one embodiment, a line-side power converter bus 223 can electrically couple line-side power converter 222 to a line filter 224. A line bus 225 can electrically couple line filter 224 to a line contactor 226. Moreover, line contactor 226 can be electrically coupled to a conversion circuit breaker 228 via a conversion circuit breaker bus 230. In addition, conversion circuit breaker 228 can be electrically coupled to main transformer circuit breaker 214 via system bus 216 and a connection bus 232. In one embodiment, line filter 224 can be electrically coupled to system bus 216 directly via connection bus 232 and can include any suitable protection scheme configured to account for removal of line contactor 226 and conversion circuit breaker 228 from electrical and control system 200. Main transformer circuit breaker 214 can be electrically coupled to an electric power main transformer 234 via a generator-side bus 236. Main transformer 234 can be electrically coupled to a grid circuit breaker 238 via a breaker-side bus 240. Grid circuit breaker 238 can be connected to the electric power transmission and distribution grid via a grid bus 242. In one embodiment, main transformer 234 can be electrically coupled to one or more fuses, rather than to grid circuit breaker 238, via breaker-side bus 240. In one embodiment, neither fuses nor grid circuit breaker 238 is used, but rather main transformer 234 is coupled to the electric power transmission and distribution grid via breaker-side bus 240 and grid bus 242.

In one embodiment, rotor-side power converter 220 can be coupled in electrical communication with line-side power converter 222 via a single direct current (DC) link 244 (also referred to as a DC bus). In one embodiment, rotor-side power converter 220 and line-side power converter 222 can be electrically coupled via individual and separate DC links. DC link 244 can include a positive rail 246, a negative rail 248, and at least one capacitor 250 coupled between positive rail 246 and negative rail 248. In one embodiment, capacitor 250 can include one or more capacitors configured in series and/or in parallel between positive rail 246 and negative rail 248.

Turbine controller 202 can be configured to receive a plurality of voltage and electric current measurement signals from a first set of voltage and electric current sensors 252. Moreover, turbine controller 202 can be configured to monitor and control at least some of the operational variables associated with wind turbine 100. In one embodiment, each of three voltage and electric current sensors 252 are electrically coupled to each one of the three phases of grid bus 242. Alternatively, voltage and electric current sensors 252 are electrically coupled to system bus 216. In one embodiment, voltage and electric current sensors 252 can be electrically coupled to any portion of electrical and control system 200 that facilitates operation of electrical and control system 200 as described herein such as on a primary of the transformer 234. In one embodiment, turbine controller 202 can be configured to receive any number of voltage and electric current measurement signals from any number of voltage and electric current sensors 252 including, but not limited to, one voltage and electric current measurement signal from one transducer.

In one embodiment, electrical and control system 200 can also include a converter controller 262 that is configured to receive a plurality of voltage and electric current measurement signals. For example, in one embodiment, converter controller 262 can receive voltage and electric current measurement signals from a second set of voltage and electric current sensors 254 coupled in electronic data communication with stator bus 208. Converter controller 262 can receive a third set of voltage and electric current measurement signals from a third set of voltage and electric current sensors 256 coupled in electronic data communication with rotor bus 212. Converter controller 262 can also receive a fourth set of voltage and electric current measurement signals from a fourth set of voltage and electric current sensors 264 coupled in electronic data communication with conversion circuit breaker bus 230. Second set of voltage and electric current sensors 254 can be substantially similar to first set of voltage and electric current sensors 252, and fourth set of voltage and electric current sensors 264 can be substantially similar to third set of voltage and electric current sensors 256.

Converter controller 262 can be substantially similar to turbine controller 202 and can be coupled in electronic data communication with turbine controller 202. Moreover, in one embodiment, converter controller 262 can be physically integrated within power conversion assembly 210. In one embodiment, converter controller 262 can have any configuration that facilitates operation of electrical and control system 200 as described herein.

In some embodiments, converter controller 262 can control power conversion assembly 210 to provide various functions such power factor control (e.g., outputting a desired amount and/or ratio of reactive power and real power), AC voltage and frequency control, etc. Power conversion assembly 210 can generate reactive power by providing a reactive current component.

During operation of example embodiments, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In one embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 can be configured to close to facilitate connecting the three-phase power from generator stator 120 with the three-phase power from power conversion assembly 210.

Conversion circuit breaker 228, main transformer circuit breaker 214, and grid circuit breaker 238 can be configured to disconnect corresponding buses, for example, when excessive current flow may damage the components of electrical and control system 200. Additional protection components can also be provided including line contactor 226, which may be controlled to form a disconnect by opening a switch corresponding to each line of line bus 225.

Power conversion assembly 210 can compensate or adjust the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, can facilitate feeding back at least some of the generated electrical power into generator rotor 122. More specifically, electrical power can transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion can be monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 can be configured to receive control signals from turbine controller 202. The control signals are based on sensed conditions or operating characteristics of wind turbine 100 and electrical and control system 200. The control signals can be received by turbine controller 202 and can be used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner.

According to example aspects of the present disclosure, the turbine controller 202 can control an operating condition of the wind turbine 100 based on operating limits determined for various electrical and/or mechanical components (e.g., cables, transformers, switches, breakers, buses, connectors, etc.) of the wind turbine 100. For instance, one or more of the converter controller 262 and the turbine controller 202 can determine an operating limit for the wind turbine 100 based on operating limits determined for each of one or more components of the wind turbine. In one embodiment, the converter controller 262 can determine the operating limit for the wind turbine 100 and communicate the operating limit to the turbine controller 202. The turbine controller 202 can adjust an operating condition of the wind turbine to stay within the operating limit for the wind turbine. For instance, the turbine controller 202 can be configured to perform one or more of adjusting a power output of the generator 118 of the wind turbine 100, adjusting a torque of the generator 118 of the wind turbine 100, or adjusting a rotational speed of the rotor 106 of the wind turbine 100 to stay within the operating limit (e.g., a speed limit or power limit) for the wind turbine 100. The turbine controller 202 can also control the reactive power output of various components by controlling the reactive current output by various components, such as the line-side power converter.

Figure 3:
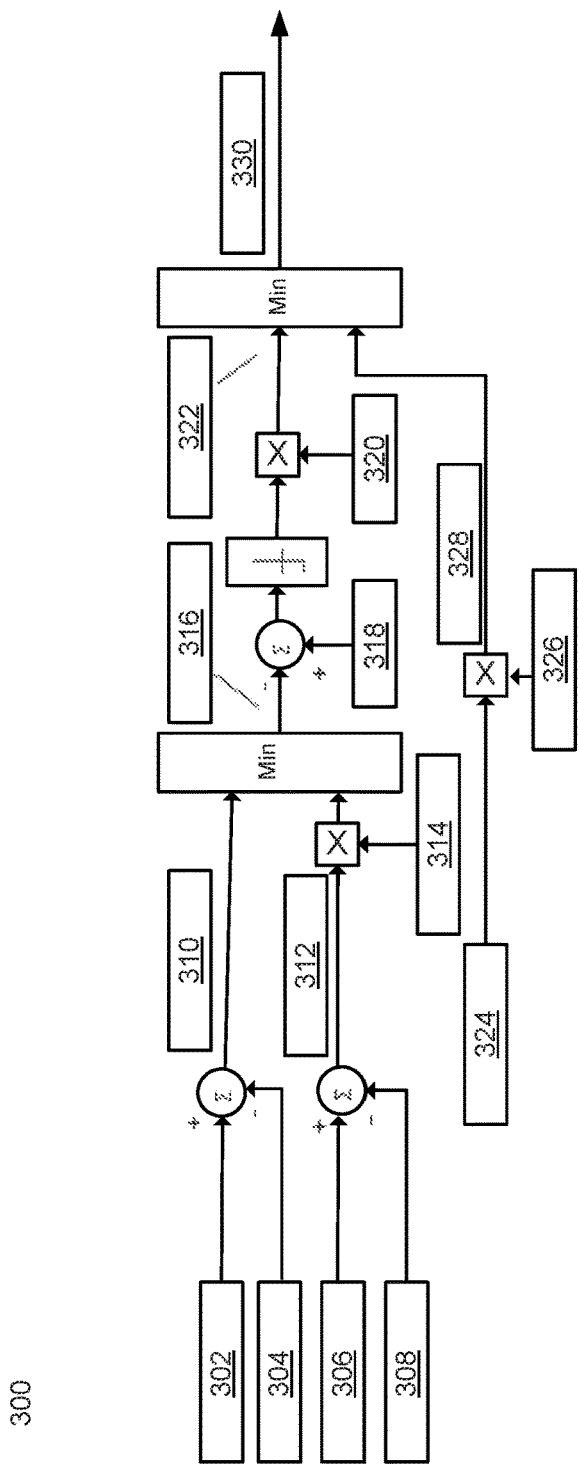
FIG. 3 depicts an example reactive current limit calculation scheme according to example embodiments of the present disclosure.

FIG. 3 depicts an example reactive current command scheme 300 that can be implemented by one or more control devices (e.g., one or more of turbine controller 202, converter controller 262, etc.). The scheme 300 can determine a reactive current command for a line side converter according to example aspects of the present disclosure that allows for full spillover or shifting of reactive current to the line converter.

The reactive current limit calculation scheme 300 receives as inputs one or more signals indicative of a stator current setpoint 302, one or more signals indicative of a filtered stator current magnitude 304, one or more signals indicative of a rotor current setpoint 306, and one or more signals indicative of a filtered rotor current magnitude 308. The stator current setpoint 302 can be based on turbine tower temperature and generator speed. The rotor current setpoint 306 can be based on turbine tower temperature and generator speed.

A stator current margin 310 can be determined by subtracting the filtered stator current magnitude 304 from the stator current setpoint 302. A rotor current margin 312 can be determined by subtracting the filtered rotor current magnitude 308 from the rotor current setpoint 306. A product can be determined by multiplying the rotor current margin by a reciprocal of ratio of rotor to stator resistance 314 to normalize the rotor current margin 312 to provide a truer comparison of stator current margin and rotor current margin. A determination can be made of a minimum 316 of the stator current margin 310 and the normalized rotor current margin. The minimum can be provided as a margin signal 316.

The margin signal 316 can be subtracted from a constant to arrive at a spillover margin. The constant can be, for example, any suitable value. If the spillover margin is negative, then the spillover margin can be adjusted to zero.

A variable spillover gain 320 can be determined by dividing a maximum line converter current by the constant. The system 300 can then determine an adjusted spillover margin 322 by multiplying the spillover margin by the determined variable gain 320.

A line current for steady-state reactive power command 324 can be adjusted by a gain 326 for the power command 324 to produce an adjusted power command 328. A reactive current command 330 can be determined as a minimum of the adjusted spillover margin 322 and the adjusted power command 328. The reactive current command 330 can be used to control the reactive current output of the line-side converter.

Figure 4:
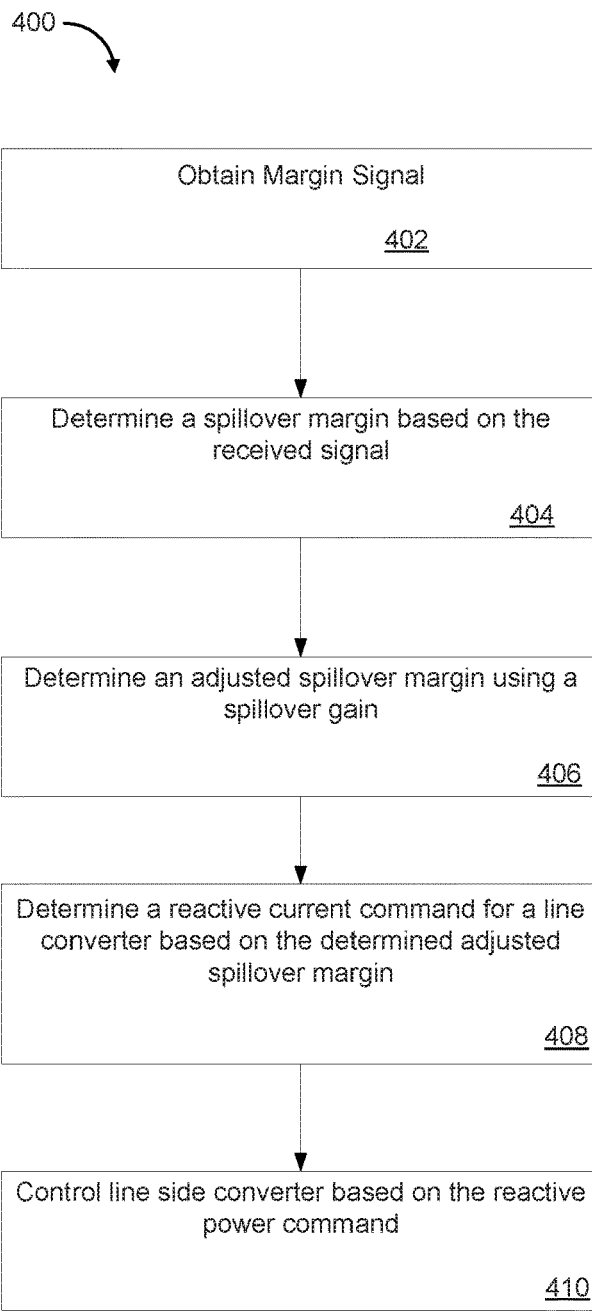
FIG. 4 depicts a flow diagram of an example control method according to example embodiments of the present disclosure.

FIG. 4 depicts a flow diagram of an example control method (400) according to example embodiments of the present disclosure. The method (400) can be implemented by one or more control devices, such as the converter controller 262, turbine controller 202 or other suitable controller(s) (e.g., farm controller, etc.). In addition, FIG. 4 depicts steps performed in a particular order for purposes of illustration and discussion, those of ordinary skill in the art, using the disclosures provided herein, will understand that various steps of any of the methods discussed herein can be adapted, modified, rearranged, omitted, or expanded in various ways without deviating from the scope of the present disclosure.

At (402), a margin signal can be received. For example, the converter controller 262 or the turbine controller 202 can obtain a margin signal. The margin signal can be determined based on a minimum of a stator current margin and a rotor current margin. The stator current margin can be a difference between a stator current subtracted by a filtered stator current magnitude. The stator current can be determined based on a turbine tower temperature and a generator speed. The rotor current margin can be a difference between a rotor current subtracted by a filtered rotor current magnitude. The rotor current can be determined based on a turbine tower temperature and a generator speed.

At (404), a spillover margin can be determined based on the margin signal. For example, the converter controller 262 or the turbine controller 202 can determine a spillover margin based on the received signal. At (406), an adjusted spillover margin can be determined using a spillover gain. For example, the converter controller 262 or the turbine controller 202 can determine an adjusted spillover margin using a spillover gain. The spillover gain can be a variable based on a maximum line converter current.

At (408), a reactive current command for a line converter can be determined based on the determined adjusted spillover margin. For example, the converter controller 262 or the turbine controller 202 can determine a reactive current command for a line converter based on the determined adjusted spillover margin. Determining a reactive current command for a line converter based on the determined adjusted spillover margin can include determining a minimum of the determined adjusted spillover margin and a filtered value for a power command. The filtered value for the power command can be a product of a line current for a steady-state reactive power command multiplied by a gain for the power command.

At (410), the method can include controlling the line-side converter based on the reactive current command. For instance, the line-side converter can be controlled to provide a reactive current output as specified in the reactive current command.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a reactive current output of a line side converter used in a power system, the method comprising:
   (a) obtaining, by one or more control devices, a margin signal determined based at least in part on a stator current margin or a rotor current margin;
   (b) determining, by the one or more control devices, a spillover margin based at least in part on the margin signal;
   (c) determining, by the one or more control devices, an adjusted spillover margin using a spillover gain, the spillover gain being variable based at least in part on a line converter current setpoint; and
   (d) determining, by the one or more control devices, a reactive current command for a line side converter based at least in part on the adjusted spillover margin and an available line current for a steady-state reactive power command, wherein the available line current for a steady-state reactive power command is based on a product of a line current for a steady-state reactive power command adjusted by a gain for the power command;
   (e) controlling, by the one or more control devices, the output of reactive current by the line converter based at least in part on the reactive current command.

2. The method of claim 1, wherein the margin signal represents a minimum of a stator current margin and a rotor current margin.

3. The method of claim 2, wherein the stator current margin is determined based on a difference between a stator current setpoint and a stator current magnitude.

4. The method of claim 3, wherein the stator current setpoint is determined based at least in part on a turbine tower temperature and a generator speed.

5. The method of claim 2, wherein the rotor current margin is determined based at least in part on a difference between a rotor current setpoint and a rotor current magnitude.

6. The method of claim 5, wherein the rotor current setpoint is determined based on a turbine tower temperature and a generator speed.

7. The method of claim 1, wherein determining a reactive current command for a line converter based on the determined adjusted spillover margin further comprises determining a minimum of the adjusted spillover margin and the available line current for a steady-state reactive power command.

8. A control system configured to control reactive current output of a power converter of a doubly fed induction generator wind power system, the power converter comprising a rotor side converter and a line side converter coupled together by a DC bus, the control system comprising memory to store instructions and a processor to execute the stored instructions, the instructions when executed by the processor cause the control system to:
   (a) receive a margin signal determined based at least in part on a stator current margin or a rotor current margin;
   (b) determine a spillover margin based on the margin signal;
   (c) determine an adjusted spillover margin using a spillover gain, wherein the spillover gain is configured to allow full spillover of reactive current from a rotor side converter to the line side converter; and
   (d) determine a reactive current command for a line converter based on the adjusted spillover margin and an available line current for a steady-state reactive power command, wherein the available line current for a steady-state reactive power command is based on a product of a line current for a steady-state reactive power command adjusted by a gain for the power command.

9. The control system of claim 8, wherein the spillover gain is determined based at least in part on a line converter current setpoint.

10. The control system of claim 8, wherein the stator current margin is determined based on a difference between a stator current setpoint and a stator current magnitude.

11. The control system of claim 10, wherein the stator current setpoint is determined based at least in part on a turbine tower temperature and a generator speed.

12. The control system of claim 8, wherein the rotor current margin is determined based at least in part on a difference between a rotor current setpoint and a rotor current magnitude.

13. The control system of claim 12, wherein the rotor current setpoint is determined based on a turbine tower temperature and a generator speed.

14. The control system of claim 8, wherein the reactive current command for the line converter is determined based at least in part on the minimum of the adjusted spillover margin and the available line current for a steady-state reactive power command.

15. A method for controlling a reactive current output of a line side converter used in a power system, the method comprising:
   (a) obtaining, by one or more control devices, a margin signal determined based at least in part on a stator current margin or a rotor current margin;
   (b) determining, by the one or more control devices, a spillover margin based at least in part on the margin signal;
   (c) determining, by the one or more control devices, an adjusted spillover margin using a spillover gain, the spillover gain being variable to allow shifting of reactive current from a rotor side converter to the line side converter; and
   (d) determining, by the one or more control devices, a reactive current command for a line side converter based at least in part on the adjusted spillover margin and an available line current for a steady-state reactive power command, wherein the available line current for a steady-state reactive power command is based on a product of a line current for a steady-state reactive power command adjusted by a gain for the power command;

(e) controlling, by the one or more control devices, the output of reactive current by the line converter based at least in part on the reactive current command.

16. The method of claim 15, wherein the spillover gain is determined based at least in part on a line converter current setpoint.

17. The method of claim 16, wherein the reactive current command for the line converter is determined based at least in part on the minimum of the adjusted spillover margin and the available line current for a steady-state reactive power command.

* * * * *